United States Patent [19]
Charek

[11] 4,369,983
[45] Jan. 25, 1983

[54] TRAILER WITH MASS RESTRAINT

[75] Inventor: Leonard T. Charek, Clinton, Ohio

[73] Assignee: The Firestone Tire & Rubber Company, Akron, Ohio

[21] Appl. No.: 200,877

[22] Filed: Oct. 27, 1980

[51] Int. Cl.³ .............................................. B62D 9/00
[52] U.S. Cl. .................................... 280/81 A; 280/758
[58] Field of Search ............. 280/755, 758, 474, 81 A, 280/81 R

[56] References Cited

U.S. PATENT DOCUMENTS

| | | | |
|---|---|---|---|
| 1,744,332 | 1/1930 | Paton et al. | 280/758 |
| 2,475,174 | 7/1949 | Boone | 280/474 |
| 2,712,945 | 7/1955 | Peterson | 280/474 |
| 2,954,985 | 10/1960 | Drong | 280/81 A |
| 3,291,503 | 12/1966 | DeLay | 280/81 A |

FOREIGN PATENT DOCUMENTS 1655636  7/1977  Fed. Rep. of Germany ... 280/81 A

Primary Examiner—Joseph F. Peters, Jr.
Assistant Examiner—Donn McGiehan
Attorney, Agent, or Firm—Olaf Nielsen

[57] ABSTRACT

In a trailer having two steerable wheels, there is provided a device which, in response to the lateral acceleration of a turn, applies a steering force to the wheels such that the tires generate a side force toward the center of the turn which is equal and opposite to that of the trailer resulting from the acceleration. As a consequence, no net force is exerted on the tow vehicle by the trailer, preserving its handling characteristics. The application is either through a mass on the trailer, or through use of the mass of the trailer itself.

9 Claims, 5 Drawing Figures

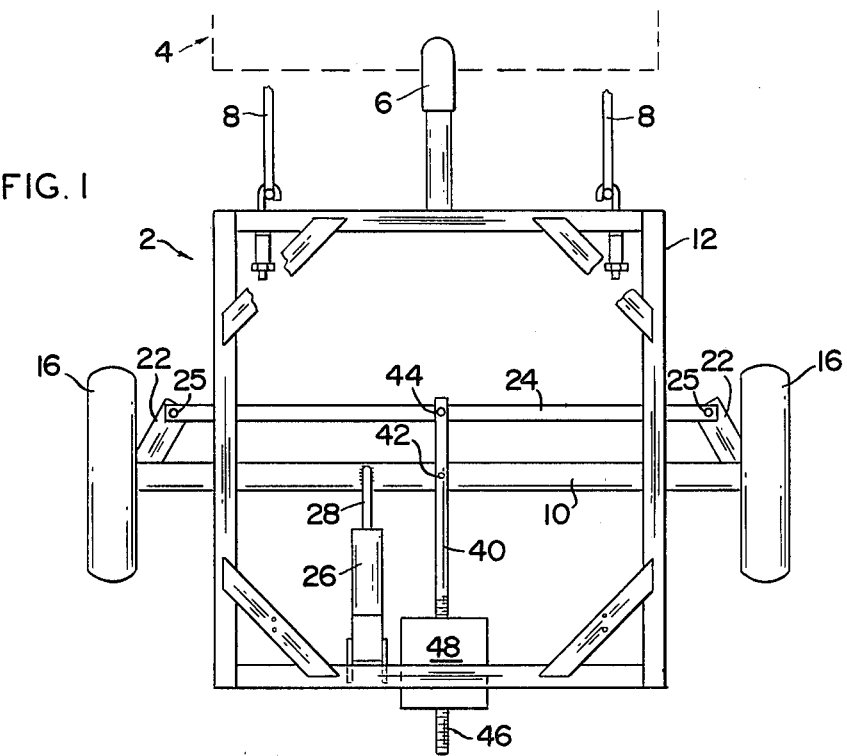
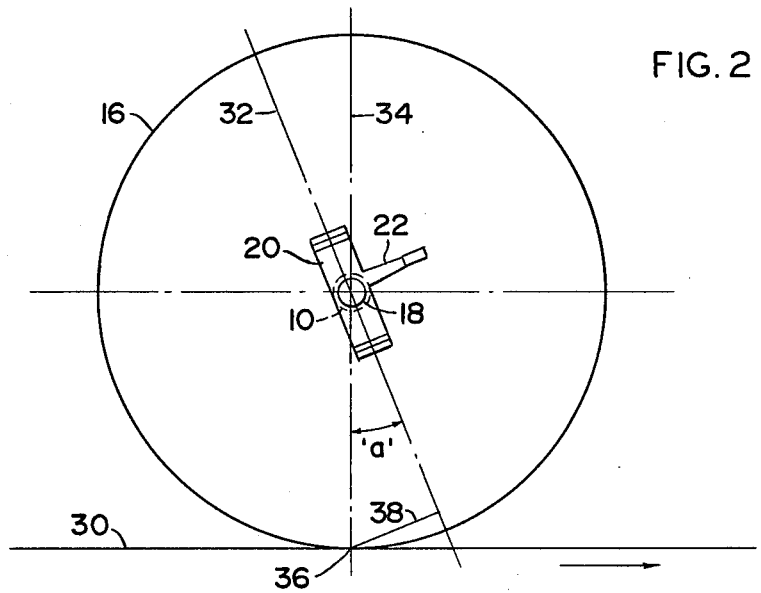

TRAILER WITH MASS RESTRAINT

FIELD OF THE INVENTION

This invention relates to a trailer having two castering, steerable wheels. Among presently known two-wheel trailers there may be found those which have multiple substantially fixed hitches for fastening the trailer to the towing vehicle. By use of such a hitch, rather than the conventional single ball-hitch, the trailer tends to be held in longitudinal alignment with the towing vehicle and may thus easily be backed up straight.

In order to avoid 'scrubbing' of the tires on curves, it is known to provide wheels which pivot independently about upright king-pins, and to connect the wheels through a tie-rod so that they pivot in unison.

Further, it is known to incline the king-pins at an angle to facilitate steering of the trailer wheels; inclination toward the rear aids steering forward. Reversing the caster angle to incline the pin forward facilitates steering in reverse. Mechanical means may be used for changing the caster angle, as well as, for example, electrical means tied to the reverse gear switch or to the back-up lights of the tow-vehicle.

The steering characteristics of the above mentioned multiple-hitch trailer with freely pivoting wheels, in conjunction with its tow vehicle or car are not acceptable, in that the car-trailer system tends to skid or spin out during cornering, i.e. the vehicle system has oversteer characteristics.

PRIOR ART

Prior art devices intended to overcome inferior handling and side-slipping of the vehicle may be classed with U.S. Pat. No. 1,783,348 to Taylor, wherein the inertia of a mass is used to resist lateral motion. Others promoting this approach are U.S. Pat. Nos. 1,821,816 (Quaas), 3,346,648 (Tolley) and 2,635,898 (Silverman), all of which disclose generating a force in response to cornering and applies it to a fixed portion of the vehicle.

U.S. Pat. No. 3,602,525 (Moulton), for example, discusses a device for generating an inward force but, during a steady state turn, all forces on the walls of the box balance out, eliminating any benefit of the device.

It is therefore an object of the invention to provide a structure in a longitudinally fixed axle trailer having means for overcoming the oversteer inherent with freely castering wheels.

SUMMARY OF THE INVENTION

The present invention solves the problems by utilizing a mass which responds to the lateral acceleration developed in cornering to create a useful force acting through a linkage to steer the trailer tires and oppose the tendency of the vehicle system to skid or spin out.

DESCRIPTION OF THE DRAWINGS

FIG. 1 is a top view of one embodiment of the trailer of the invention, with non-essential parts removed for clarity;

FIG. 2 is a schematic side view showing a portion of the steering assembly during forward motion;

DESCRIPTION OF A PREFERRED EMBODIMENT

In FIG. 1, a trailer denoted generally at 2 is attached to a towing vehicle 4 (shown in phantom) by a hitch including a ball hitch 6 and two tension members 8 in an arrangement which ensures that the trailer axle 10 will generally remain parallel to the axle of the towing vehicle; in other words, the trailer will not yaw. At the same time, the trailer may roll a limited amount about its longitudinal axis, and may pitch up and down. It will be clear that, so long as the fixed relationship described is maintained between tow vehicle and trailer, the tension members may be replaced by compression members.

Figure 3:
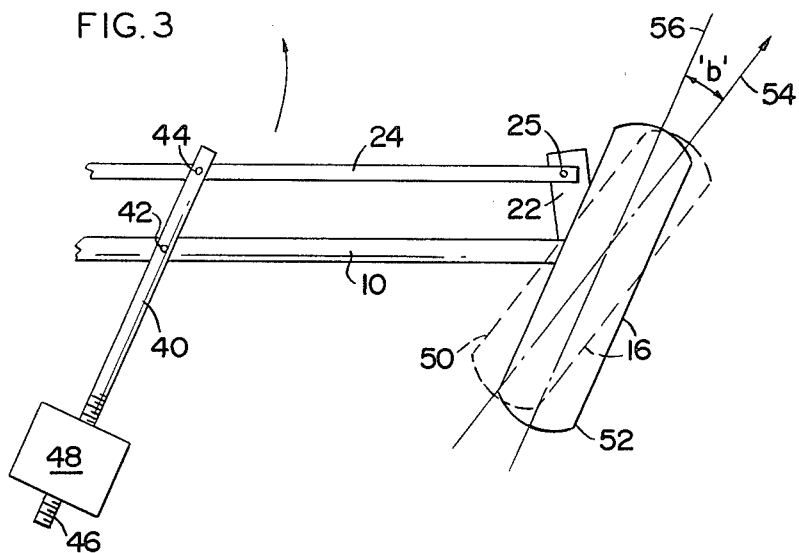
FIG. 3 is a schematic top view showing a portion of the steering assembly of the invention.

The frame 12 of the trailer is suitably sprung on the axle by means not shown. The axle 10 carries steerable wheels 14 having pneumatic tires 16 mounted thereon. As best seen in FIGS. 2 and 3, each wheel is carried on the spindle 18 of an upright king-pin 20 from which extends also a tie-rod connector 22 pivotally connected to tie rod 24 at 25. While the king 20 pin turns so that the tire steers right or left, it is itself pivoted in the vertical plane to permit the caster angle of the tire to be changed. In its simplest form, pivoting of the king-pin may be accomplished by activating a linear actuator such as a pressure cylinder 26 secured to frame 12 and having a rod 28 which rotates the axle 10 and thus the king-pin 20 through the desired number of degrees. In FIG. 2, the arrow indicates the direction of travel of tire 16 along the ground 30. The king-pin is shown inclined rearwardly, so that its steering axis 32 intersects the ground at a point ahead of the vertical center line 34 of the tire 16. The intersection of the center line 34 with the ground is named the center of contact pressure 36 of the tire; this is the point at which the force of the ground acts upon the tire. In this condition, the tire will caster as it is moved along the ground, the angle 'a' between the tire centerline 34 and the steering axis 32 being the caster angle. The distance normally from point 36 at center line 34 to axis 32 represents a moment arm 38 through which the ground reaction force acts.

An arm 40 is pivotally fixed to the axle 10 at 42; one end of the arm is movably pivoted to the tie rod 24 at 44, while the other end is threaded as at 46 and carries an adjustable weight or mass restraint 48.

In FIG. 3 is shown the situation where a turn to the left in the direction of the arrow takes place.

Without the mass restraint 48 in place, if the direction of tire travel as indicated by line 54 does not coincide with the plane of the tire 16, i.e. if the tire is running at a slip angle, a ground reaction force is generated at 36 (see FIG. 2) and acts through the moment arm 38. This generates a moment about 32 which steers the tires into the travel direction 54, a tire position indicated by the dashed outline 50. In this position, no net moment exists about the steering axis 32 and the tire will remain in this position unless the radius of the turn is changed.

Since the direction of tire travel is in the plane of the tire, no slip angle is present, and no tire side force is generated. Thus, additional mass has been added to the rear of the tow vehicle without providing additional cornering force by the trailer tires. When a turn is made, the additional force needed to restrain this mass from spinning out must come from the rear tires of the tow vehicle. At some level of turn severity, the rear tires will be unable to provide enough side force, and the vehicle system will spin out.

With the mass restraint 48 in place, however, its acceleration toward the right during the continuation of the left turn creates a counter-clockwise moment about pivot 42; this is transferred through the steering linkage shown and appears as a counter-clockwise moment about the steering axis 32.

This moment causes the tires to turn from the dashed position 50, through angle 'b' referred to as the slip angle, to position 52. At this slip angle, the tire will generate a force at 36 into the page (FIG. 2), acting through the arm 38 to create a moment clockwise about the steering axis 32. This balances the counter-clockwise moment due to the mass restraint 48, thereby eliminating any net moment about the steering axis 32. The side force generated at 36 is proportional to slip angle 'b'; therefore the tires will not steer beyond position 52 since this would result in an increased clockwise moment about 32 and return the tires to position 52.

The amount of side force developed by the trailer tires is thus controlled by the size of the mass 48. By properly selecting its size, the force (weight) acting to skid the trailer out of the turning circle can be exactly balanced by the force of the ground reacting at 36 toward the inside of the turn. At this point, the trailer exerts no steering effect on the tow vehicle.

The trailer of FIGS. 1 and 2 exhibited a weight of about 68 kilograms (kg), carried on two 4-ply rating pneumatic tires mounted on 200 millimeter (mm) diameter wheels and having a vertical section height of about 100 mm. The inflation pressure of the tires was approximately 276 kilo pascals (kPa). The caster angle 'a' was set by means of actuator 26 at approximately 15°, resulting in a moment arm 38 of about 51 mm.

It was found that, during cornering, a mass 48 of 4.5 kg, adjusted along the threaded portion 46 to a point where the arm 40 to the mass-center was 760 mm long, would minimize the effect of the trailer on the handling characteristics of the tow vehicle.

The following analysis obtains. Assuming, for example, that the lateral acceleration during a turn is 1 g, the mass of the restraint 48 results in a moment of approximately 34 Newton-meters (N.m) about the steering axis 32. This moment must be balanced by an opposing moment provided by the tire side force acting at 36 through the moment arm 38. Since the length of 38 is 51 mm, a force of approximately 67 kg must be developed at 36 to generate the necessary 34 N.m counter-moment.

With the trailer at about 68 kg, it will be noted that the clockwise and counter-clockwise moments about the steering axis are substantially balanced. Different accelerations would influence equally the force generated at 36 and the force generated by the trailer-mass, provided the trailer mass and the restraint remain unchanged.

In a further test, with an additional 110 kg load in the trailer, a balance-condition was achieved with a mass 48 weight of 11 kg at 760 mm. This acknowledges that the moment arm 38 was now slightly shorter than 51 mm, due to the fact that the additional load had flattened the tire somewhat and moved point 36 vertically a slight amount.

In all instances, the relationship established above proved true on actual test; i.e., handling characteristics were greatly improved when the ratio of the mass of the trailer to the mass of restraint 48 substantially equalled the ratio of the length of arm 40 to the length of arm 38.

Figure 4:
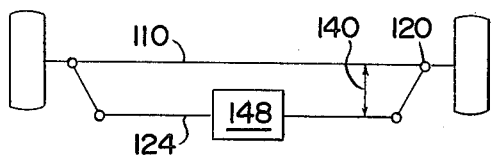
FIG. 4 is a schematic top view showing a modified form of the invention.

FIG. 4 shows, in a trailer travelling in the direction of the arrow, an application of the invention which contemplates a mass 148 located directly on the tie rod 124, acting through arm 140 to create a moment around the king pin steering axis 120. With the moment arm 140 held quite short, it will be noted that mass 148 must be of substantial size and, in fact, approach the weight of the trailer it is attempting to balance out.

It may not always be desirable to utilize a system in which the effect of the mass restraint must be adjusted either by its size or in the length of its arm. Another approach utilizes the trailer box and cargo mass as the restraint mass, in the following manner.

It is not necessary that the mass be applied directly as a weight in order to correct the steer, so long as its motion upon lateral acceleration will effect the necessary countering pivoting of the tires about the king pin. The weight of the trailer may therefore be supported vertically on the axle, for example, so long as that support allows reasonably free lateral motion within a limited area.

Figure 5:
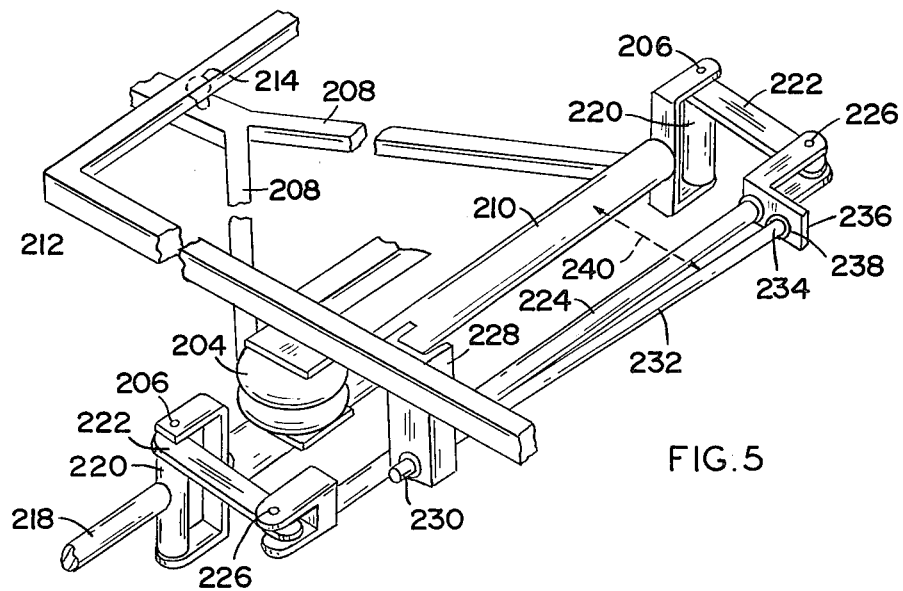
FIG. 5 is a perspective view of a further modification of the invention, with certain parts removed for clarity.

The significant portion of such an arrangement is seen in FIG. 5 in which the weight of the trailer, represented by the frame 212, is supported on axle 210 by inflatible airsprings 204 designed to allow lateral displacement. As previously stated, the axle is held against yaw with respect to the tow vehicle, as for example by an axle support such as draw-bars 208 which may form part of the trailer hitch (not shown). The main trailer weight is thus supported by airsprings 204, which allow the frame a limited lateral motion with respect to the axle 210 and about the front pivot ball 214 set in the axle support.

Each king pin 220 is pivotable about its steering axis at 206, while the steering axis may be shifted by means, not shown, but similar to 26, 28 of FIG. 1. Each kingpin carries a wheel spindle 218 as well as a tie-rod connector 222 pivotally engaged with the tie-rod 224 at pivot 226. The frame 212 is provided with a bracket or strut 228 which carries one end 230 of a steering rod 232 extending substantially transversely of the frame. The other end 234 of the steering rod engages a bracket or flange 236 forming a portion of one end of the tie-rod 224. Since the frame will move vertically and tilt on its airspring suspension as it travels over the road, the ends 230 and 234 of the steering rod are lodged in strut 228 and in the flange 236, respectively, in an articulated manner including for example bushings or bearings such as 238. Lateral motion of the frame 212 will, through strut 228, steering rod 232, flange 236, and tie-rod connector 222 effectively turn the king-pins 220 in a direction to generate controlling side force by the tires, while minimizing steering effects due to vertical motion in flange 236.

The distance 240 between axle 210 and steering rod 232 is preferably designed to be substantially as long as the moment arm 38 (see FIG. 2). In this manner, the force generated by the acceleration of the weight of the trailer, multiplied by the moment-arm 240, will substantially equal and oppose the ground reaction force at 36 multiplied by the moment arm 38, to balance the steer.

Thus, with the moment arms 38 and 240 equal, the lateral force resulting from the weight on the trailer must always equal the steer-correction force.

I claim:
1. In a trailer, the improvement comprising
a transverse axle, wheels mounted on members pivoted at each end of said axle about an inclined axis;

a connecting rod connecting said members to turn said wheels in unison, and a mass, the lateral acceleration of which applies a first steering moment about said inclined axis to balance a second opposed moment applied about said axis by the ground reactive force on said wheels.

2. A trailer as in claim 1, wherein said mass acts on said connecting rod.

3. A trailer as in claim 1, wherein said mass acts on said connecting rod through an arm pivoted on said axle.

4. A trailer comprising a mass supported by a wheel steerable about a pivot, first means facilitating motion of said mass with respect to said pivot, and second means associated with said mass to apply a first steering moment about said pivot upon lateral acceleration of said mass to balance a second moment applied by the ground reactive force on said wheel about said pivot.

5. A trailer as in claim 4, wherein said first means comprises suspension means allowing lateral motion.

6. A trailer as in claim 4 or 5, wherein said second means comprises linkage means between said mass and a king-pin rotatable about said pivot.

7. A trailer as in claim 4 or 5, wherein said second means comprises a steering rod connected to the said mass.

8. A trailer as in claim 4, wherein the length of the moment arm through which the said mass acts is substantially equal to that through which the ground reactive force on said wheel acts.

9. In a trailer, the improvement comprising a transverse axle, wheels mounted on members pivoted at each end of said axle about an inclined axis;

a connecting rod connecting said members to turn said wheels in unison, and means to apply a first steering moment about said inclined axis and balancing a second opposed moment applied about said axis by the ground reactive force on said wheels, said means comprising a mass having lateral acceleration during cornering of said trailer.

* * * * *